US011578611B2

(12) United States Patent
Poick

(10) Patent No.: US 11,578,611 B2
(45) Date of Patent: Feb. 14, 2023

(54) VARIABLE GUIDE VANE ASSEMBLY AND BUSHINGS THEREFOR

(71) Applicant: PRATT & WHITNEY CANADA CORP., Longueuil (CA)

(72) Inventor: Daniel Poick, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/105,558

(22) Filed: Nov. 26, 2020

(65) Prior Publication Data

US 2022/0162958 A1 May 26, 2022

(51) Int. Cl.
*F01D 17/16* (2006.01)
*F01D 25/24* (2006.01)
*F04D 29/56* (2006.01)
*F04D 29/64* (2006.01)

(52) U.S. Cl.
CPC ......... *F01D 17/165* (2013.01); *F01D 25/243* (2013.01); *F05D 2240/12* (2013.01); *F05D 2240/14* (2013.01); *F05D 2300/603* (2013.01)

(58) Field of Classification Search
CPC .... F01D 17/165; F01D 17/162; F01D 25/246; F01D 25/24; F01D 7/00; F01D 9/04; F01D 25/243; F05D 2240/12; F05D 2240/14; F05D 2260/50; F05D 2250/90; F05D 2260/30; F05D 2230/64; F05D 2300/603; F04D 29/563; F04D 27/0246; F04D 29/644; F04D 27/002; F04D 29/023
See application file for complete search history.

(56) References Cited

U.S. PATENT DOCUMENTS

| 7,300,245 | B2 * | 11/2007 | Bouru | F01D 17/162 415/147 |
|---|---|---|---|---|
| 7,413,401 | B2 * | 8/2008 | Szucs | F01D 17/162 415/162 |
| 8,794,910 | B2 * | 8/2014 | Gasmen | F01D 25/243 415/160 |
| 10,364,828 | B2 * | 7/2019 | Ikeguchi | F01D 17/162 |
| 2006/0133925 | A1 | 6/2006 | Bouru | |
| 2007/0166150 | A1 | 7/2007 | Szucs et al. | |

OTHER PUBLICATIONS

European Search Report issued in counterpart application 21209218.3 dated Apr. 12, 2022.

* cited by examiner

*Primary Examiner* — Eric J Zamora Alvarez
(74) *Attorney, Agent, or Firm* — Norton Rose Fulbright Canada LLP

(57) ABSTRACT

A gas turbine engine has: an annular gaspath extending around a central axis and defined between a first casing and a second casing; and a variable guide vane (VGV) assembly having: variable guide vanes, the variable guide vanes having airfoils extending between first and second stems at respective first and second ends of the airfoils, the variable guide vanes rotatable about respective spanwise axes; a unison ring rotatable about the central axis, the unison ring operatively connected to the variable guide vanes for rotating the variable guide vanes about the respective spanwise axes, and a segmented bushing having bushing segments circumferentially distributed around the central axis, the bushing segments radially supported and axially constrained by the first casing, the unison ring rollingly engaged to the first casing via the bushing segments, the unison ring axially and radially constrained to the first casing via the bushing segments.

20 Claims, 7 Drawing Sheets

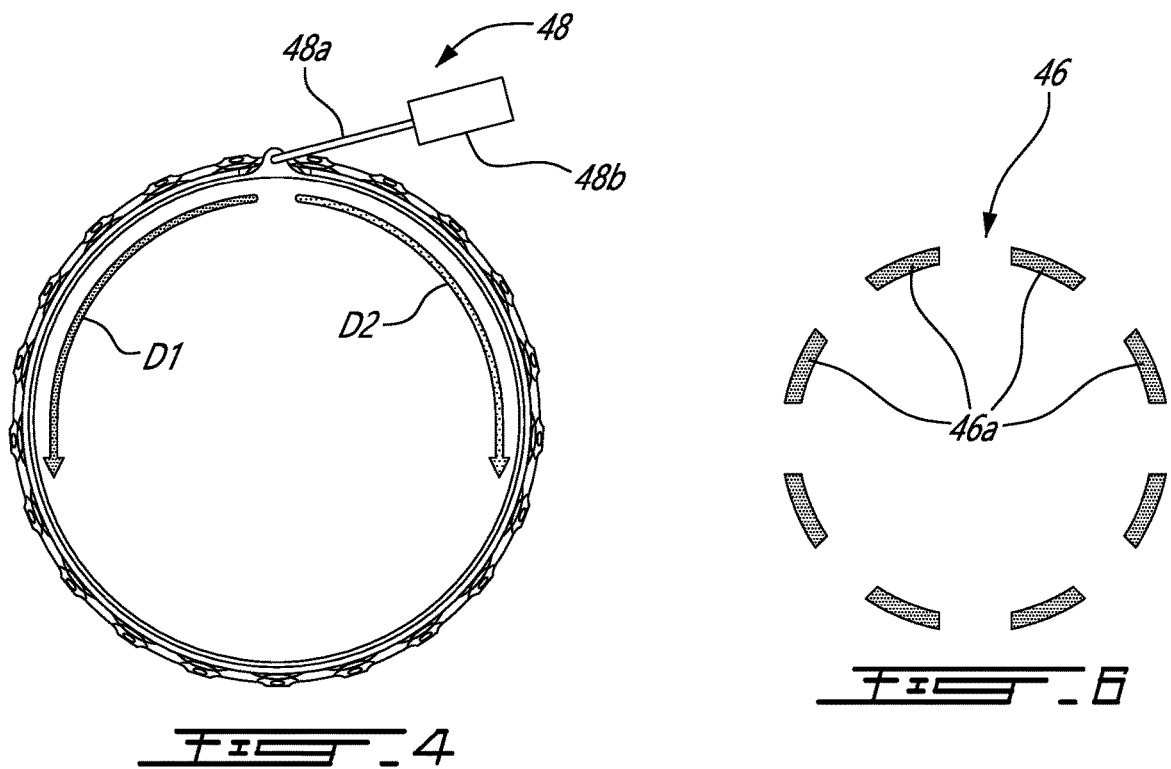
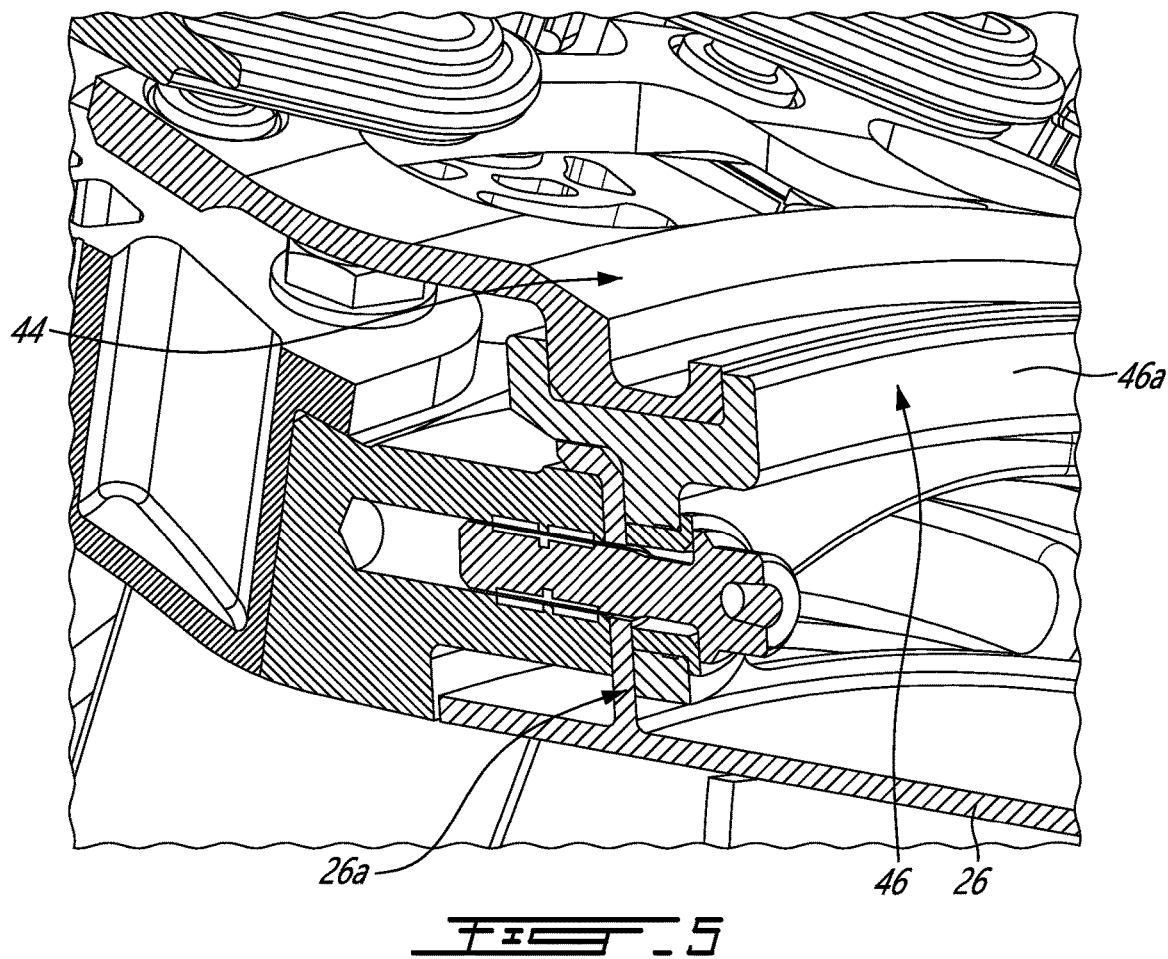

FIG_8

VARIABLE GUIDE VANE ASSEMBLY AND BUSHINGS THEREFOR

TECHNICAL FIELD

The disclosure relates generally to gas turbine engines, and more particularly to variable guide vanes assemblies as may be present in a compressor section and/or a turbine section of a gas turbine engine.

BACKGROUND OF THE ART

In a gas turbine engine, air is pressurized by rotating blades within a compressor, mixed with fuel and then ignited within a combustor for generating hot combustion gases, which flow downstream through a turbine for extracting energy therefrom. Within the compressor of the engine, the air is channelled through circumferential rows of vanes and blades that pressurize the air in stages. Variable guide vanes (VGVs) are sometimes used within compressors and/or turbines, and provide vanes which are rotatable such that the angle of attack they define with the incoming flow may be varied. Improvements with such variable guide vane assemblies is sought.

SUMMARY

In one aspect, there is provided a gas turbine engine, comprising: an annular gaspath extending around a central axis, the annular gaspath defined between a first casing and a second casing; and a variable guide vane (VGV) assembly having: variable guide vanes circumferentially distributed about a central axis, the variable guide vanes having airfoils extending between first and second stems at respective first and second ends of the airfoils, the variable guide vanes rotatable about respective spanwise axes; a unison ring rotatable about the central axis, the unison ring operatively connected to the variable guide vanes for rotating the variable guide vanes about the respective spanwise axes, and a segmented bushing having bushing segments circumferentially distributed around the central axis, the bushing segments radially supported and axially constrained by the first casing, the unison ring rollingly engaged to the first casing via the bushing segments, the unison ring axially and radially constrained to the first casing via the bushing segments.

In some embodiments, one of a portion of the unison ring and the bushing segments defines a groove extending around the central axis, another one of the portion of the unison ring and the bushing segments received within the groove.

In some embodiments, the groove includes a plurality of grooves each defined by a respective one of the bushing segments.

In some embodiments, the bushing segments are secured to the unison ring such that the bushing segments and the unison ring rotate together about the central axis.

In some embodiments, the first casing defines a casing groove defined between two rims of the first casing, the two rims extending circumferentially around the central axis and protruding from a wall of the first casing, the bushing segments axially constrained by the two rims within the casing groove, a distance between the two rims corresponding to an axial depth of the bushing segments, the bushing segments slidingly engaged to the first casing within the casing groove.

In some embodiments, one of the two rims defines a cut-out, a radial height of the one of the two rims at the cut-out being less than that of a remainder of the one of the two rims, the radial height sized to allow the bushing segments to be inserted between a portion of the unison ring and the first casing within the casing groove.

In some embodiments, a width of the cut-out taken in a circumferential direction relative to the central axis being at least a width of one of the bushing segments.

In some embodiments, the first casing defines at least one flange, the bushing segments being secured to the at least one flange, the unison ring rotating relative to the bushing segments about the central axis.

In some embodiments, the bushing segments are made of a composite material.

In some embodiments, the first casing is located radially outwardly of the second casing relative to the central axis.

In another aspect, there is provided a gas turbine engine, comprising: an annular gaspath extending around a central axis, the annular gaspath defined between a first casing and a second casing; and a variable guide vane (VGV) assembly having: variable guide vanes circumferentially distributed about a central axis, the variable guide vanes having airfoils extending between first and second stems at respective first and second ends of the airfoils, the variable guide vanes rotatable about respective spanwise axes; a unison ring rotatable about the central axis, the unison ring operatively connected to the variable guide vanes for rotating the variable guide vanes about the respective spanwise axes, and a segmented bushing having bushing segments circumferentially distributed around the central axis, the bushing segments radially supported by the first casing, the bushing segments sandwiched between a portion of the unison ring and the first casing, the unison ring rollingly engaged to the first casing via the bushing segments, the unison ring being axially locked to the first casing via the bushing segments.

In some embodiments, one of the portion of the unison ring and the bushing segments defines a groove extending around the central axis, another one of the portion of the unison ring and the bushing segments received within the groove.

In some embodiments, the groove includes a plurality of grooves each defined by a respective one of the bushing segments.

In some embodiments, the bushing segments are secured to the unison ring such that the bushing segments and the unison ring rotate together about the central axis.

In some embodiments, the first casing defines a casing groove defined between two rims of the first casing, the two rims extending circumferentially around the central axis and protruding radially from a wall of the first casing, the bushing segments axially constrained by the two rims within the casing groove, a distance between the two rims corresponding to an axial depth of the bushing segments, the bushing segments slidingly engaged to the first casing within the casing groove.

In some embodiments, one of the two rims defines a cut-out, a radial height of the one of the two rims at the cut-out being less than that of a remainder of the one of the two rims, the radial height sized to allow the bushing segments to be inserted between a portion of the unison ring and the first casing within the casing groove.

In some embodiments, a width of the cut-out taken in a circumferential direction relative to the central axis being at least a width of one of the bushing segments.

In some embodiments, the first casing defines at least one flange, the bushing segments being secured to the at least one flange, the unison ring rotating relative to the bushing segments about the central axis.

In some embodiments, the bushing sections are made of a composite material.

In some embodiments, the first casing is located radially outwardly of the second casing relative to the central axis.

DESCRIPTION OF THE DRAWINGS

Reference is now made to the accompanying figures in which:

FIG. 4 is a front view of a unison ring of the variable guide vane assembly of FIG. 3;

FIG. 5 is a three dimensional cutaway view of the variable guide vane assembly of FIG. 3 viewed at a different angle illustrating a bushing in accordance with one embodiment for supporting the unison ring of FIG. 4;

FIG. 6 is a schematic front view of a bushing assembly in accordance with one embodiment for the variable guide vane assembly of FIG. 3;

DETAILED DESCRIPTION

The following disclosure relates generally to gas turbine engines, and more particularly to assemblies including one or more struts and variable orientation guide vanes as may be present in a compressor section of a gas turbine engine. In some embodiments, the assemblies and methods disclosed herein s promote better performance of gas turbine engines, such as by improving flow conditions in the compressor section in some operating conditions, improving the operable range of the compressor, reducing energy losses and aerodynamic loading on rotors.

Figure 1:
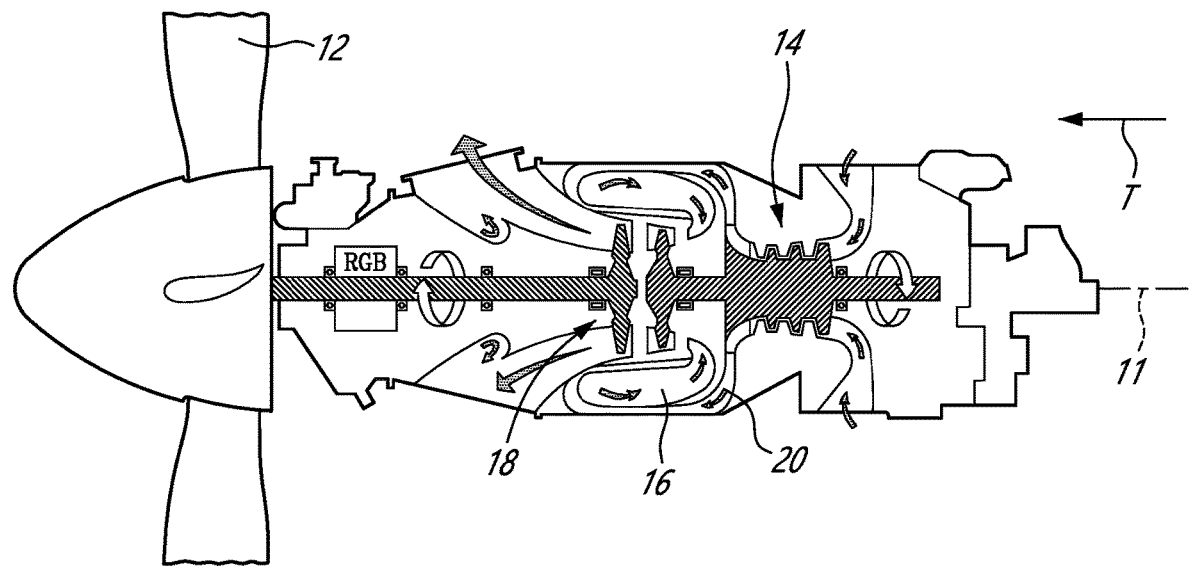
FIG. 1 is a schematic cross sectional view of a gas turbine engine.

FIG. 1 illustrates a gas turbine engine 10 of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the annular gaspath 20 from a rear of the engine 10 to a front of the engine 10 relative to a direction of travel T of the engine 10. This is opposite than a through-flow engine in which the air flows within the gaspath 20 in a direction opposite the direction of travel T, from the front of the engine towards the rear of the engine 10. The principles of the present disclosure may apply to reverse-flow and through flow engines and to any other gas turbine engines, such as a turbofan engine and a turboprop engine.

Figure 2:
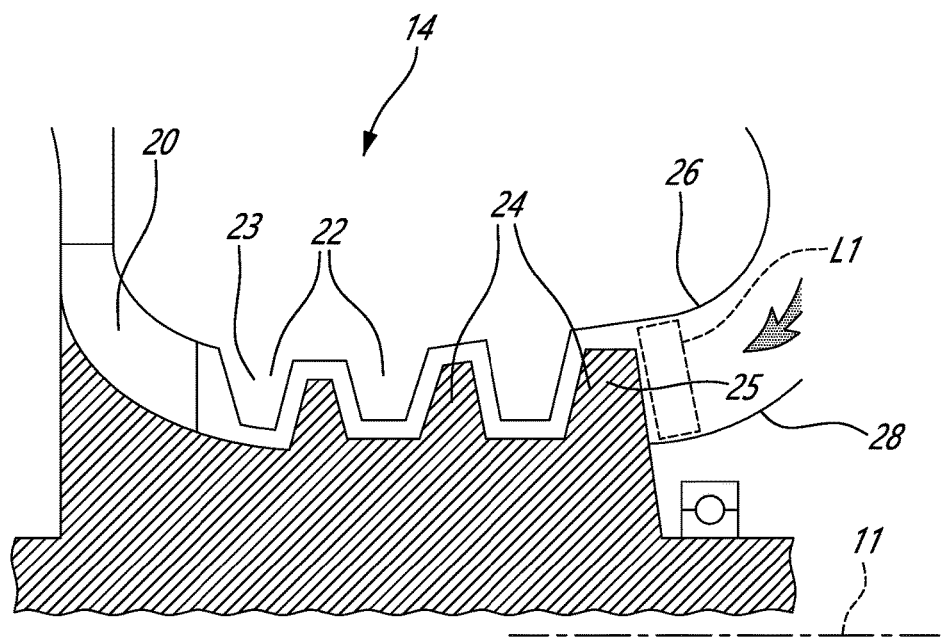
FIG. 2 is an enlarged view of a portion of FIG. 1.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the gaspath 20. Each of the rotors 24 also includes a plurality of blades 25 circumferentially distributed around the central axis 11 and extending into the gaspath 20, the rotors 24 and thus the blades 25 thereof rotating about the central axis 11. As will be seen in further detail below, at least one of the stators 22 includes vanes 23, which are variable guide vanes (VGVs) and thus includes a variable guide vane assembly 40 as will be described.

In the depicted embodiment, the gaspath 20 is defined radially between an outer casing or wall 26 and an inner casing or wall 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber).

Figure 3:
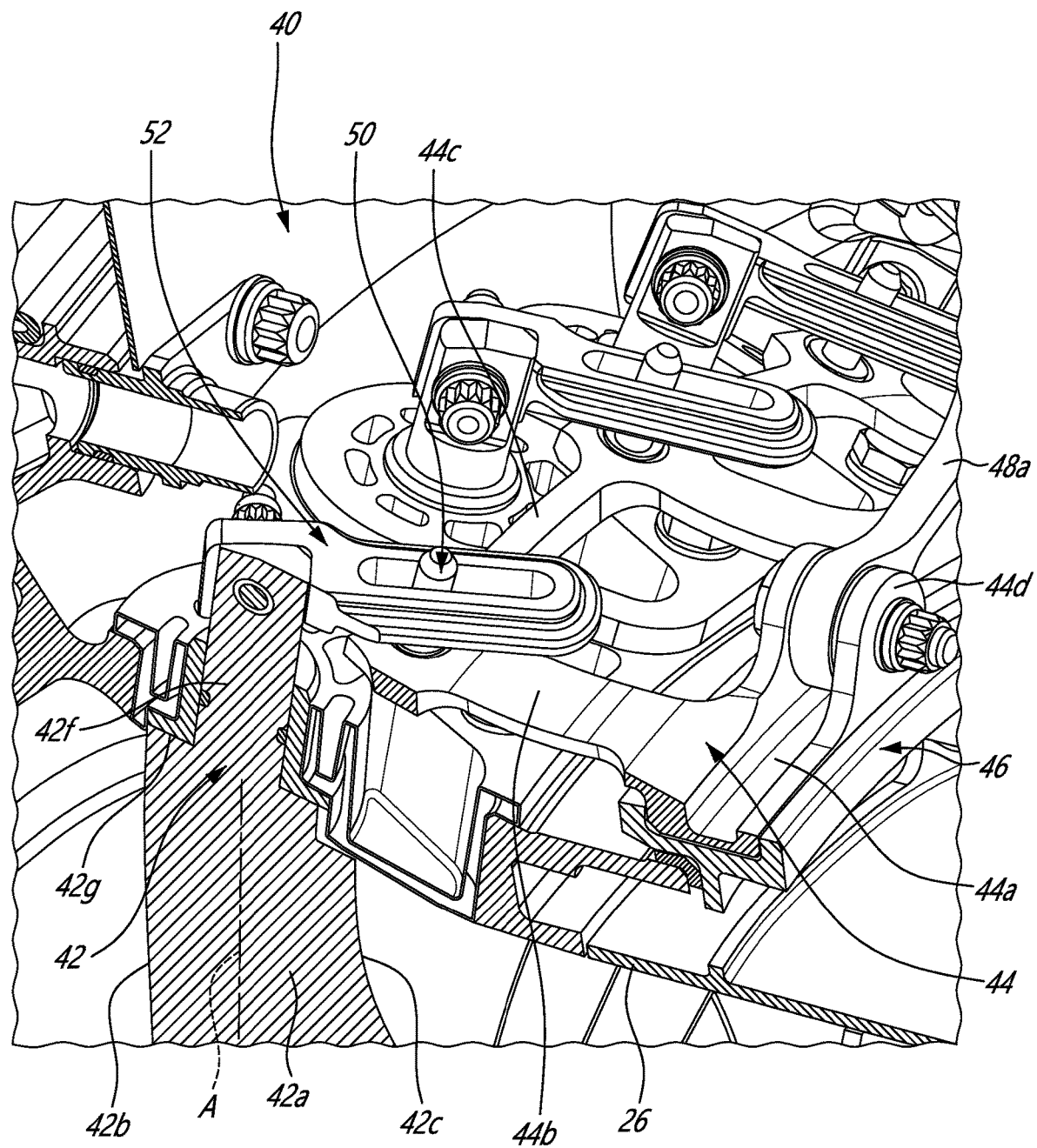
FIG. 3 is a three dimensional cutaway view of a portion of a variable guide vane assembly to be used with the engine of FIG. 1.

Referring to FIG. 3, an example of a variable guide vane (VGV) assembly of a stator 22 of the engine 10 is shown at 40. Any of the stators 22 of the compressor section 14 depicted in FIG. 2 may be embodied as a variable guide vane 40. It will be appreciated that, in some cases, the VGV assembly 40 may be used as a stator of the turbine section 18 of the engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of vanes 42, only one being illustrated in FIG. 3, circumferentially distributed about the central axis 11 and extending radially between the inner casing 28 (FIG. 2) and the outer casing 26. In the present embodiment, the vanes 42 are rotatably supported at both of their ends by the inner and outer casings 28, 26. Particularly, each of the vanes 42 has an airfoil 42a having a leading edge 42b and a trailing edge 42c both extending along a span of the airfoil 42a. Each of the vanes 42 has an inner stem (not shown), also referred to as an inner shaft portion, at an inner end of the airfoil 42a and an outer stem, also referred to as an outer shaft portion, 42f, at an outer end 42g of the airfoil 42a. The inner and outer stems may be rollingly engaged to the inner and outer casings, 28, 26, respectively. As shown in FIG. 3, the outer stems 42f are rollingly engaged within apertures defined through the outer casing 26. The vanes 42 are rotatable about respective spanwise axes A to change an angle of attack defined between the vanes 42 and a flow flowing within the annular gaspath 20. In the embodiment shown, the spanwise axes A extend between the inner and outer stems of the vanes 42

Referring to FIGS. 3-4, the VGV assembly 40 includes a unison ring 44, also referred to as a drive ring, which extends annularly all around the central axis 11. The unison ring 44 is used to convert a linear motion input into a rotational motion output. The unison ring 44 is used to synchronize the motion of the variable guide vanes 42 about their respective spanwise axes A. The unison ring 44 is rollingly engaged to the outer casing 26. Particularly, in the embodiment shown, a bushing 46 is secured to the outer casing 26, the unison ring 44 slides on the bushing 46 when the unison ring 44 rotates about the central axis 11. The bushing 46 constrains the unison ring 44 axially and radially relative to the central axis 11 such that the unison ring 44 moves solely circumferentially relative to the central axis 11. In the embodiment shown, the unison ring 44 has a first section 44a that is rollingly engaged to the bushing 46, connecting arms 44b that extend from the first section 44a in a direction having an axial component relative to the central axis 11, and a second section 44c that extends circumferentially all around the central axis 11. Hence, in the depicted embodiment, the first and second sections 44a, 44c of the unison ring 44 are connected to one another via the plurality of connecting arms 44b that are circumferentially interspaced around the central axis 11. In the embodiment shown, the first section 44a, the second section 44c, and the connecting arms 44b are all part of a monolithic single body. It will however be understood that, in an alternate embodiment, the unison ring 44 may be made of a plurality of separate sections secured to one another.

The unison ring 44 defines attachment flanges 44d that are used to secure a movable member 48a of an actuator 48 (FIG. 4). Although two flanges 44d are used in the embodiment shown for receiving therebetween an end of the movable member 48a of the actuator 48, only one flange 44d may be used. The actuators 48 may be secured to the outer casing 26 and operable to move the movable member 48a along its longitudinal axis. In so doing, the unison ring 44 rotates around the central axis 11 along direction D1 or D2 depending if the movable member 48a is extended or retraced from a body 48b of the actuator 48.

As illustrated in FIG. 3, the VGV assembly 40 includes sliders, also referred to as driving pins, 50 that are secured to the unison ring 44. The sliders 50 may be secured to the unison ring 44 by being monolithic with the unison ring 44. In the present case, the sliders 50 are separate components secured (e.g., threaded, welded, etc) to the second section 44c of the unison ring 44 and each of the sliders 50 is circumferentially aligned with a respective one of the connecting arms 44b. In a particular embodiment, having the unison ring 44 having two sections and connecting arms creates a stiffer structure and allows for enhanced rigidity. In a particular embodiment, the unison ring may include a truss shape or a grid pattern. Moreover, the two sections with arms allow to remove more material and, thus, reduce the weight. Each of the sliders 50 extends from the unison ring 44 along a direction having a radial component relative to the central axis 11.

The VGV assembly 40 includes vane arms 52. Each of the vane arms 52 is secured to a respective one of the outer stems 42f of the vanes 42 and extends substantially transversally away from the outer stems 42f. That is, each of the vane arms 52 extends in directions having a radial component relative to its spanwise axis A of the vanes 42. The vane arms 52 are engageable by the sliders 50 to rotate the vanes 42 about their respective spanwise axes A. That is, rotation of the unison ring 44 about the central axis 11 moves the sliders 50 circumferentially relative to the central axis 11. This causes the sliders 50 to slide within the slots 52 thereby pivoting the vane arms 52 and the vanes 42 secured thereto about the respective spanwise axes A of the vanes 42 for changing the angle of attacks defined between the vanes 42 and the flow flowing within the annular gaspath 20.

Referring now to FIG. 5, the bushing 46 is used as an interface between the outer casing 26 and the unison ring 44. The bushing 46 is rollingly engaged by the unison ring 44 to allow rotation of the unison ring 44 about the central axis 11. The unison ring 44 must be free to rotate about the central axis 11 of the engine 10 in a circumferential direction relative to the central axis 11 to control the angle of attack of the vanes 42, but it may be preferable that the unison ring 44 has no other degrees of freedom. The bushings described in the present disclosure allow rotation of the unison ring 44 about the outer casing 26 and restrict motion of the unison ring 44 in all other directions (e.g., radial, axial). It is understood that, in the present disclosure, "restrict", "block", "constrain", and "lock" may allow some slight movements caused by manufacturing tolerances. In the present embodiment, the bushing 46 is located radially outward of the outer casing 26 of the engine 10. Although, in some cases, the bushing 46 and the unison ring 44 may be located radially inward of the inner casing 28.

In the hot air engine environment in which the variable guide vane assembly 40 is used, thermal growth rates of radially overlapped components have to be analyzed to ensure each material's hoop strength is not exceeded. The present disclosure proposes two embodiments in which the bushing 46, which may be made of a composite, is located radially outward of the outer casing 26, which is usually made of a metallic material stiffer than the material of the bushing 46. In some embodiment, engine temperature increase causes the outer casing 26 to grow faster than the bushing 46, and the hoop strength of a continuous annular bushing ring might be exceeded. To address this, both proposed embodiments use segmented bushings. Several bushing pieces are spaced, preferably equally spaced apart, around the central axis 11 to allow thermal growth of the outer casing 26 without being impeded by the bushing 46.

Referring to FIGS. 5-6, in the present embodiment, the bushing 46 is a bushing assembly, also referred to as a segmented bushing, including a plurality of bushing segments, referred to below simply as "bushings", 46a circumferentially distributed around the central axis 11. Any suitable number of bushings 46a (e.g., 2, 3, 4, etc) may be used. In the embodiment shown, five bushings 46a are used. The quantity of the bushings 46a is a function of maximizing surface contact and dynamic behaviour of the actuator/unison ring 44. In the embodiment shown, the outer casing 26 defines flanges 26a circumferentially distributed about the central axis 11 of the engine 10. It will be appreciated that, in an alternate embodiment, the flanges 26a may be replaced by a single flange extending annularly around the central axis 11. Each of the bushings 46a is secured to a respective one of the flanges 26a of the outer casing 26. As shown, the bushings 46a are radially supported by the first casing 26 and are axially constrained by the first casing 26. The unison ring 44 is rollingly engaged to the first casing 26 via the bushings 46a. The unison ring 44 is axially and radially constrained to the first casing 26 via the bushings 46a. Stated differently, the bushings 46a are sandwiched between a portion of the unison ring 44 and the first casing 26. The unison ring 44 is axially locked to the first casing 26 via the bushings 46a. In the present disclosure, "axial/radially constrained" and "axially/radially locked" implies that movements in an axial/radial direction are substantially blocked. However, it will be appreciated that some small movements resulting from manufacturing tolerances may still be possible whereas movements in a circumferential direction relative to the central axis 11 may be possible. In the present embodiment, the bushings 46a are fastened to the flanges 26a of the outer casing 26. The fasteners and the flanges 26a therefore limit axial, radial, and circumferential translation of the bushings 46a relative to the outer casing 26.

Figure 7:
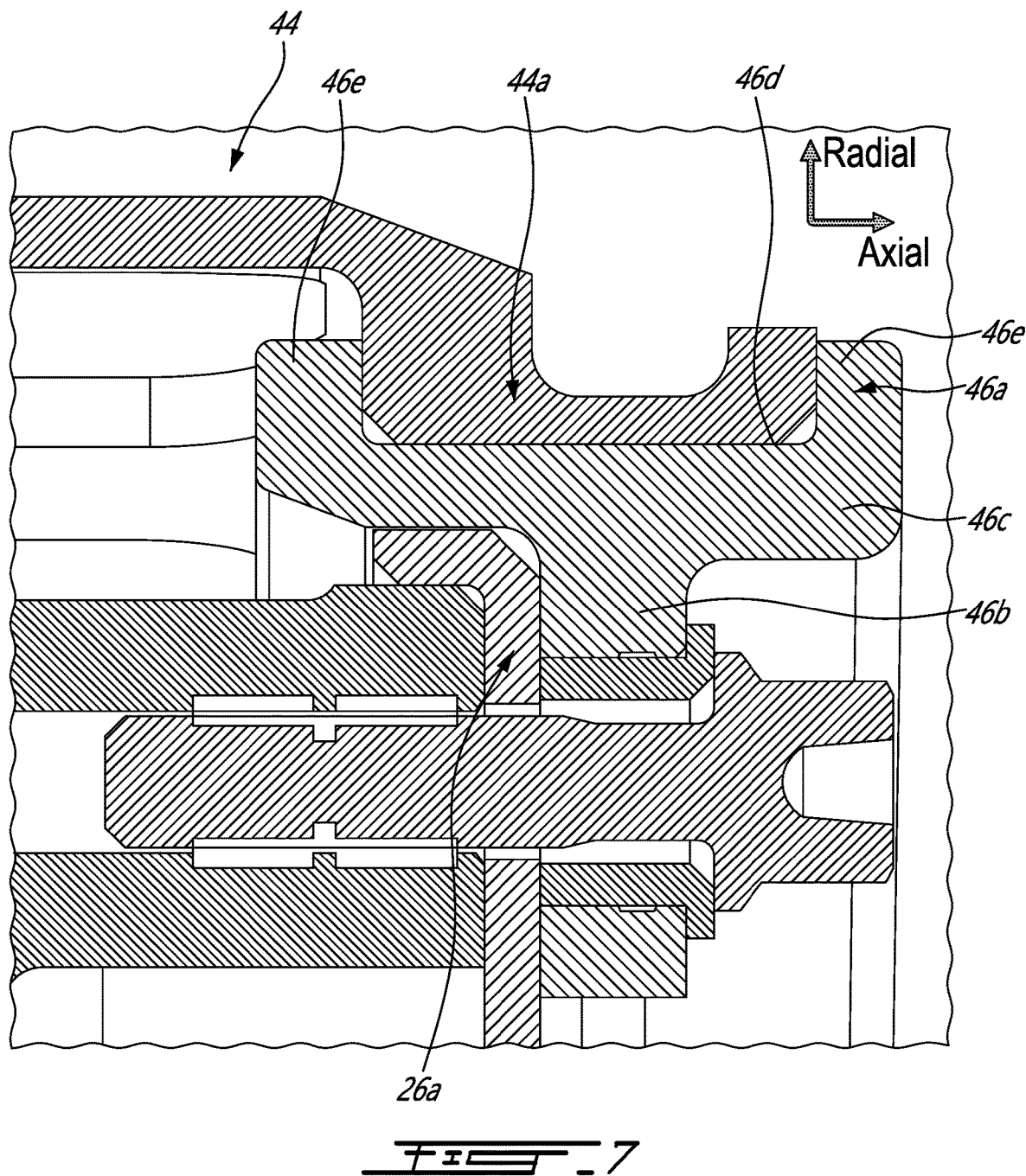
FIG. 7 is an enlarged view of a portion of FIG. 5 shown at a different angle.

Referring to FIGS. 5-7, each of the bushings 46a includes a flange 46b that is secured to a respective one of the flanges 26a of the outer casing 26. The flange 46b of the bushing 46a extends radially inwardly from a ring-supporting section 46c of the bushing 46a. The ring-supporting section 46c of the bushing 46a defines a groove 46d. The groove 46d is defined axially between two arcuate walls 46e of the ring-supporting section 46c of the bushing 46a. The groove 46d is sized to receive the first section 44a of the unison ring 44 and is therefore used to limit axial translation of the unison ring 44 relative to the central axis 11. A width of the groove 46d, corresponding to a distance taken along the central axis 11 and between the two arcuate walls 46e, is sized to receive the first section 44a of the unison ring 44. In use, when the actuator 48 is powered to rotate the unison ring 44 along directions D1 or D2, the unison ring 44 slides within the groove 46d such that the unison ring 44 rotates relative to the bushing 46a about the central axis 11. The bushings 46a are sandwiched between the outer casing 26 and the unison ring 44. It will be understood that, in an alternative embodiment, the unison ring may define a groove extending annularly around the central axis 11 and sized to receive portions of the bushings 46a in said groove. Alternatively, the bushings 46a and unison ring 44 may define a tab and slot engagement.

The bushings 46a may be made of composite molded materials, such as polyamide with a carbon filler. Any other suitable composite materials and any suitable bushing material may be used. In some cases, a material with self-lubricity may be used as interfaces of these systems are usually non-lubricated. The material may include, for instance graphite/Teflon infused composites, graphite/oil impregnated metallic materials. In some cases, the bushings 46a may be made of a metallic material. The bushings 46a may be made of the same material as that of the unison ring 44.

The bushing assembly 46 is segmented to allow the insertion of the first section 44a of the unison ring 44 into the groove 46d of the bushings 46a. Without this segmented configuration, it might not be possible to couple the bushing 46 to the unison ring 44. Moreover, thermal expansion of the outer casing 26 may differ from that of the bushing 46 since they may be exposed to different temperatures and/or they may be made of different material. Consequently, having the bushing assembly 46 being segmented in bushings 46a circumferentially distributed around the central axis 11 may avoid thermal fight between those components.

Figure 8:
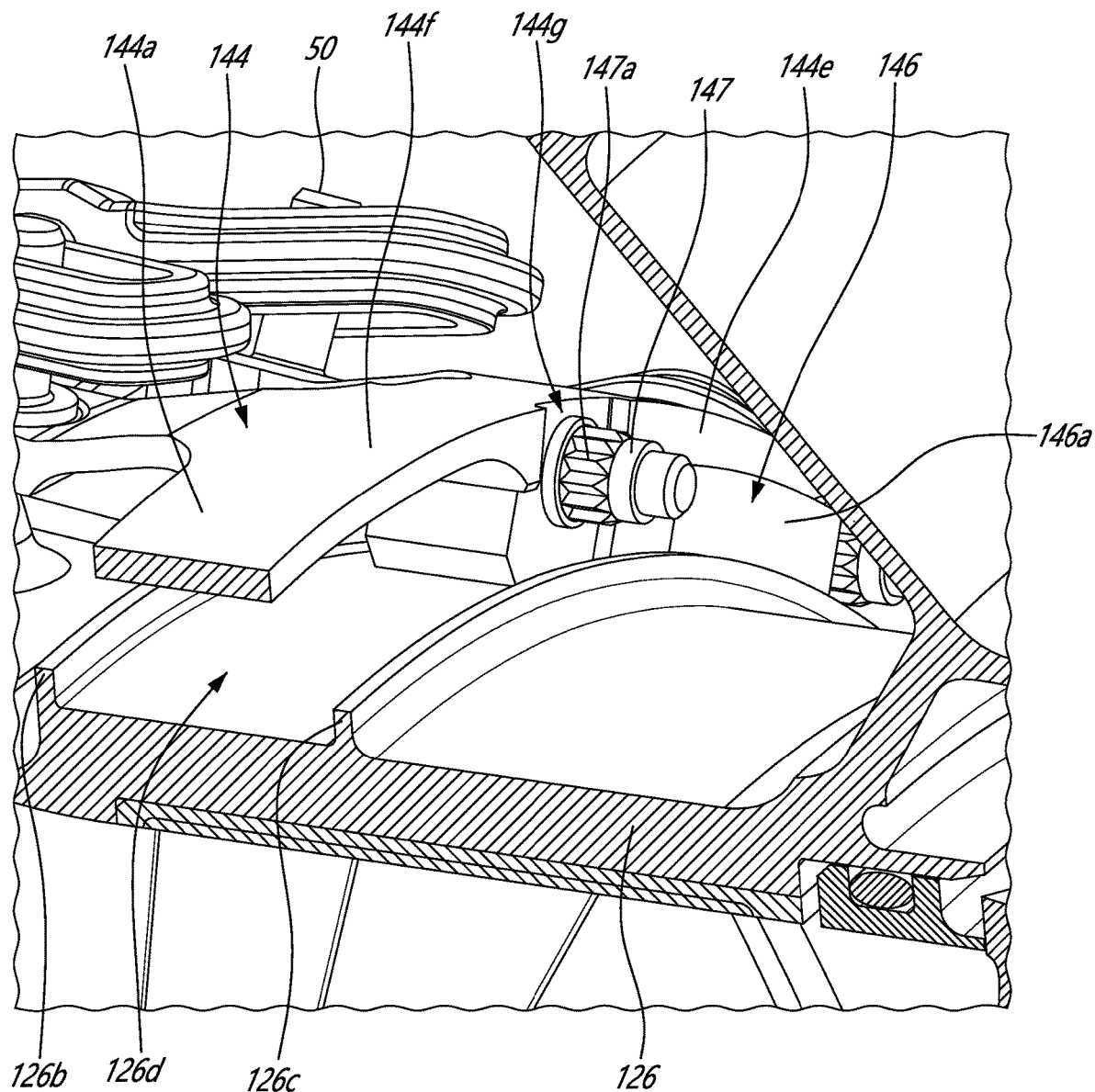
FIG. 8 is a three dimensional cutaway view of a variable guide vane assembly illustrating a bushing assembly in accordance with another embodiment for supporting a unison ring in accordance with another embodiment.

Referring now to FIG. 8, another embodiment of a bushing assembly, unison ring, and outer casing are shown at 146, 144, and 126, respectively. Similarly, the bushing 146 is an assembly of a plurality of bushings 146a circumferentially distributed around the central axis 11. Any suitable number of bushings 146a (e.g., 2, 3, 4, etc) may be used. In the embodiment shown, six bushings 146a are used. The quantity of the bushings 146a is a function of maximizing surface contact and dynamic behaviour of the actuator/unison ring 44. The bushings 146a are secured to the first section 144a of the unison ring 144 via fasteners 147. In the embodiment shown, each of the bushings 146a is secured to the unison ring 144 via two fasteners 147. As shown, the bushings 146a are radially supported by the first casing 126 and are axially constrained by the first casing 126. The unison ring 144 is rollingly engaged to the first casing 126 via the bushings 146a. The unison ring 144 is axially and radially constrained to the first casing 126 via the bushings 146a. Stated differently, the bushings 146a are sandwiched between a portion of the unison ring 144 and the first casing 126. The unison ring 144 is axially locked to the first casing 126 via the bushings 146a.

In the illustrated embodiment, the first section 144a of the unison ring 144 includes bushing-engaging portions 144e circumferentially interspaced around the central axis 11 and interconnected to one another by intermediate portions 144f. A thickness of the bushing-engaging portions 144e taken in a radial direction relative to the central axis 11 is greater than that of the intermediate portions 144f. Each of the bushing-engaging portions 144e defines two notches 144g at its opposite ends. The notches 144g extend from a face of the unison ring 144 toward the sliders 50 and are sized to receive heads 147a of the fasteners 147 as will be explained below.

Figure 9:
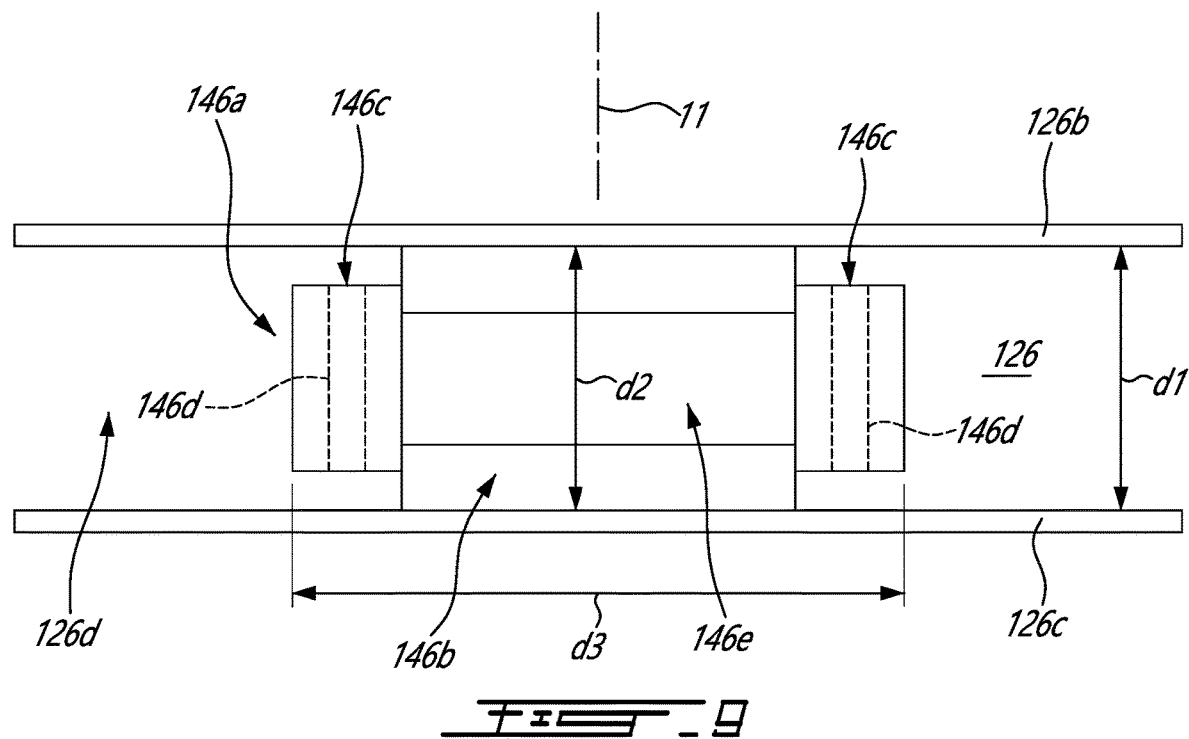
FIG. 9 is a schematic top view of a bushing of the bushing assembly of FIG. 8 received within a casing groove of another embodiment of a casing for the engine of FIG. 1.

Referring to FIGS. 8-9, the outer casing 126 defines first and second rims 126b, 126c protruding radially outwardly from a wall of the outer casing 126. The first and second rims 126b, 126c are axially spaced apart from one another. The first and second rims 126b, 126c extends annularly all around the central axis 11 and define a groove 126d between the first and second rims 126b, 126c. The groove 126d is sized to receive the bushings 146a. In other words, a distance d1 between the two rims 126b, 126c taken along the central axis 11 corresponds to an axial depth d2 of the bushings 146a. As shown in FIG. 9, the bushing 146a defines a central portion 146b and two side portions 146c protruding circumferentially from opposite circumferential ends of the central portion 146b. An axial depth of the side portions 146c of the bushing 146 taken along the central axis 11 is less than that of the central portion 146b. An axial depth of the central portion 146b corresponds to the distance d1 between first and second rims 126b, 126c. Each of the two side sections 146c defines an aperture 146d extending in an axial direction relative to the central axis 11 that is sized to receive a respective one of the fasteners 147 therein. The apertures 146d are located such that the heads 147a of the fasteners 147 are partially received within the notches 144g of the unison ring 144 to circumferentially lock the bushings 146a relative to the unison ring 144. In other words, the unison ring 144 is secured to the bushings 146a via the fasteners 147.

Figure 10:
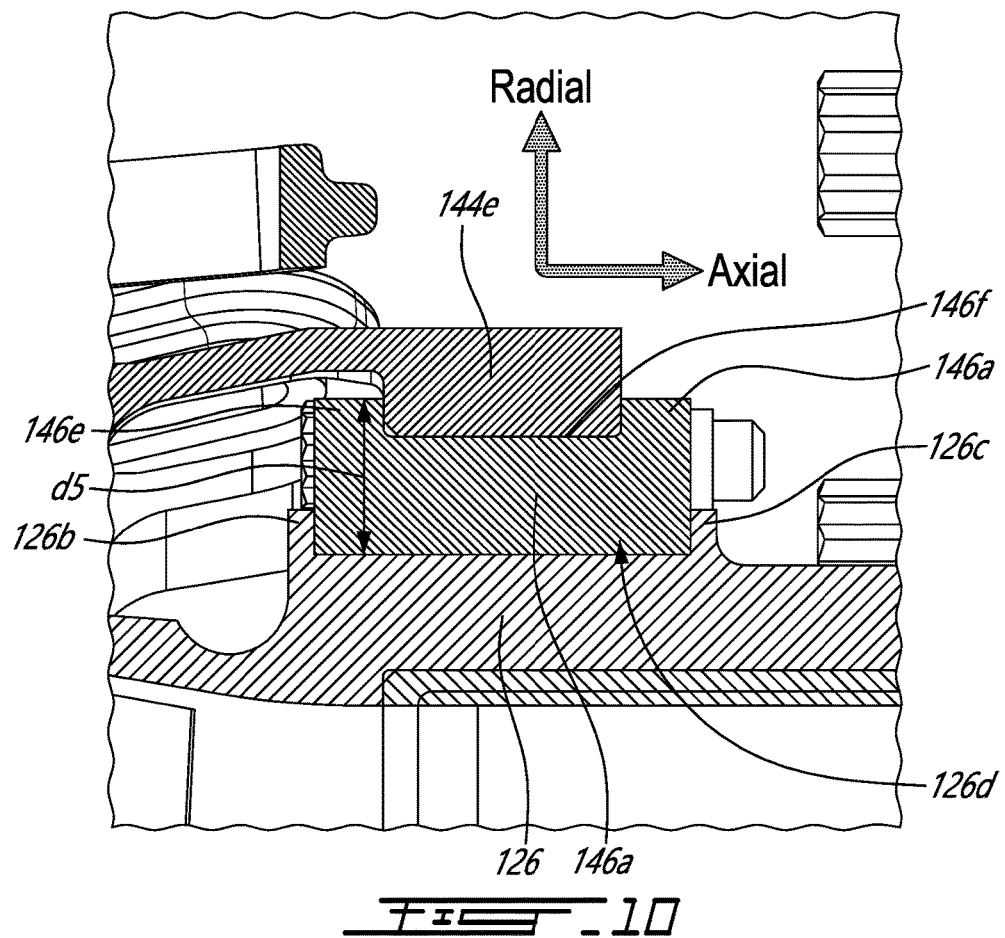
FIG. 10 is a cutaway view of the variable guide vane assembly of FIG. 8.

Referring now to FIG. 10, each of the bushings 146a has two arcuate walls 146e defining a groove 146f therebetween. The groove 146f is sized to receive a portion of the unison ring 144. More specifically, in the embodiment shown, the grooves 146f of the bushings 146a are sized to receive the bushing-engaging portions 144e of the first section 144a of the unison ring 144. Therefore, in the depicted embodiment, the bushings 146a are sandwiched between the unison ring 144 and the outer casing 126, more specifically, between the bushing-engaging portions 144e of the unison ring 144 and the outer casing 126 and are axially aligned with the casing groove 126d. It will be understood that, in an alternative embodiment, the unison ring 144 may define a groove extending annularly around the central axis 11 and sized to receive portions of the bushings 146a in said groove.

In the depicted embodiment, a portion of the unison ring 144 is constricted axially and radially by the bushings 146a by being received within the grooves 146f of the bushings 146a and the bushings 146a are constricted axially and radially by the outer casing 126 and by the first and second rims 126b, 126c defining the groove 126d containing the bushings 146a. The unison ring 144 and the bushings 146a are secured to one another and rotate together relative to the outer casing 126 about the central axis 11.

Figure 11:
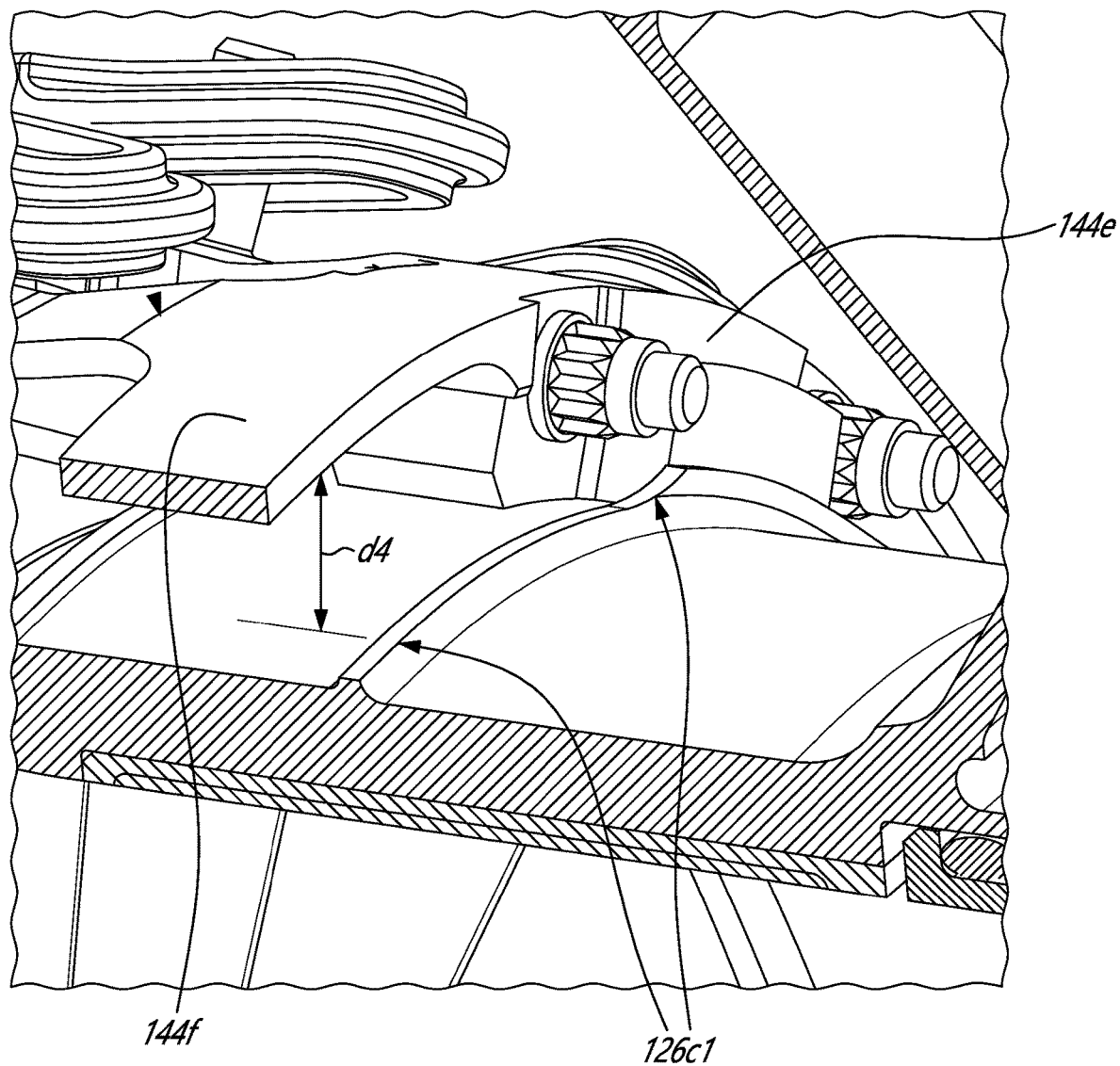
FIG. 11 is another three dimensional cutaway view of the variable guide vane assembly of FIG. 8.

Referring now to FIG. 11, in the embodiment shown, a radial distance between the outer casing 126 and the intermediate portions 144f of the unison ring 144 is greater than a radial distance between the outer casing 126 and the bushing-engaging sections 144e of the unison ring 144. In order to insert the bushings 146a between the unison ring 144 and the outer casing 126, the second rim 126c has a reduced radial height section, or cut-out, or scallop, 126c1 along a portion of its circumference. A width of said cut-tout 126c1 taken in a circumferential direction relative to the central axis is at least a width d3 (FIG. 9) of each of the bushings 146a. To insert the bushings 146a, the unison ring 144 is rotated about the central axis 11 relative to the outer casing 126 until one of the intermediate portions 144f of the first section 144a of the unison ring 144 is circumferentially aligned with the reduced radial height section 126c1 of the second rim 126. A distance d4 taken along a radial direction relative to the central axis 11 between the intermediate portions 144f of the unison ring 144 and the second rim 126c at the reduced radial height section 126c1 is therefore greater than a radial height d5 (FIG. 10) of the bushings 126a. The bushings 126a may be inserted one by one between the unison ring 144 and within the groove 126d of the outer casing 126. Once a bushing 146a is received within the groove 126d of the outer casing 126, the bushing 146a may be moved circumferentially relative to the outer casing 126 and within the groove 126d until a respective one of the bushing-engaging portions 144e of the unison ring 144 is received within the groove 146f of the bushing 146a. The fasteners 147 may therefore be inserted in to the apertures 146d (FIG. 9) of the bushings 146a and the unison ring 144 and the bushings 146a secured thereto may be rotated relative to the outer casing 126 until another one of the intermediate portions 144f of the unison ring 144 is circumferentially aligned with the reduced height section 126c1 of the second rim 126c to insert another one of the bushings 146a between the unison ring 144 and the outer casing 126 and within the groove 126d of the outer casing 126. The above steps are repeated until all of the bushings 146a are in place.

Some alternate design does not have any specific geometry to prevent axial translation of the unison ring, rather the design requires a close tolerance pin arrangement to accurately locate the unison ring. Axial retention is achieved by sheet metal vane arms. These arms are equally spaced circumferentially around the VGV assembly and hold the unison ring in place. The unison ring of these alternate designs move axially with movements of the vane arms. These vane arms may exhibit twisting due to their thin sheet metal design.

The disclosed variable guide vane assemblies may address this issue in different ways. The VGV assembly of FIG. 8 uses rims in the outer casing 126 to axially trap the bushings 146a and unison ring 144. The VGV assembly of FIG. 5 uses fasteners to secure the bushings 46a directly to the outer casing 26 and permit rotation of the unison ring 44 within its outer diameter. Neither of the proposed designs may require a close tolerance pin arrangement, which may reduce part complexities.

The proposed designs may allow smooth rotation between the components by using a composite bushing material with low friction coefficient. The case geometry of the proposed designs may also be easier to manufacture.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine, comprising:
   an annular gaspath extending around a central axis, the annular gaspath defined between a first casing and a second casing; and
   a variable guide vane (VGV) assembly having:
      variable guide vanes circumferentially distributed about the central axis, the variable guide vanes having airfoils extending between first and second stems at respective first and second ends of the airfoils, the variable guide vanes rotatable about respective spanwise axes;
      a unison ring rotatable about the central axis, the unison ring having a first portion and a second portion axially offset from the first portion relative to the central axis, the first portion of the unison ring operatively connected to the variable guide vanes for rotating the variable guide vanes about the respective spanwise axes; and
      a segmented bushing having bushing segments circumferentially distributed around the central axis, the first portion of the unison ring axially offset from the bushing segments, the bushing segments radially supported and axially constrained by the first casing, the second portion of the unison ring rollingly engaged to the first casing via the bushing segments, the second portion of the unison ring axially and radially constrained to the first casing via the bushing segments.

2. The gas turbine engine of claim 1, wherein the bushing segments defines a groove extending around the central axis, the second portion of the unison ring received within the groove.

3. The gas turbine engine of claim 2, wherein the groove includes a plurality of grooves each defined by a respective one of the bushing segments.

4. The gas turbine engine of claim 1, wherein the bushing segments are secured to the unison ring such that the bushing segments and the unison ring rotate together about the central axis.

5. The gas turbine engine of claim 4, wherein the first casing defines a casing groove defined between two rims of the first casing, the two rims extending circumferentially around the central axis and protruding from a wall of the first casing, the bushing segments axially constrained by the two rims within the casing groove, a distance between the two rims corresponding to an axial depth of the bushing segments, the bushing segments slidingly engaged to the first casing within the casing groove.

6. The gas turbine engine of claim 5, wherein one of the two rims defines a cut-out, a radial height of the one of the two rims at the cut-out being less than that of a remainder of the one of the two rims, the radial height sized to allow the bushing segments to be inserted between a portion of the unison ring and the first casing within the casing groove.

7. The gas turbine engine of claim 6, wherein a width of the cut-out taken in a circumferential direction relative to the central axis being at least a width of one of the bushing segments.

8. The gas turbine engine of claim 1, wherein the first casing defines at least one flange, the bushing segments being secured to the at least one flange, the unison ring rotating relative to the bushing segments about the central axis.

9. The gas turbine engine of claim 1, wherein the bushing segments are made of a composite material.

10. The gas turbine engine of claim 1, wherein the first casing is located radially outwardly of the second casing relative to the central axis.

11. A gas turbine engine, comprising:
an annular gaspath extending around a central axis, the annular gaspath defined between a first casing and a second casing; and
a variable guide vane (VGV) assembly having:
variable guide vanes circumferentially distributed about the central axis, the variable guide vanes having airfoils extending between first and second stems at respective first and second ends of the airfoils, the variable guide vanes rotatable about respective spanwise axes;
a unison ring rotatable about the central axis, the unison ring having a first portion and a second portion axially offset from the first portion relative to the central axis, the first portion of the unison ring operatively connected to the variable guide vanes for rotating the variable guide vanes about the respective spanwise axes, and
a segmented bushing having bushing segments circumferentially distributed around the central axis, the first portion of the unison ring axially offset from the bushing segments, the bushing segments radially supported by the first casing, the bushing segments sandwiched between the second portion of the unison ring and the first casing, the second portion of the unison ring rollingly engaged to the first casing via the bushing segments, the second portion of the unison ring being axially locked to the first casing via the bushing segments.

12. The gas turbine engine of claim 11, wherein the bushing segments defines a groove extending around the central axis, the portion of the unison ring received within the groove.

13. The gas turbine engine of claim 12, wherein the groove includes a plurality of grooves each defined by a respective one of the bushing segments.

14. The gas turbine engine of claim 11, wherein the bushing segments are secured to the unison ring such that the bushing segments and the unison ring rotate together about the central axis.

15. The gas turbine engine of claim 14, wherein the first casing defines a casing groove defined between two rims of the first casing, the two rims extending circumferentially around the central axis and protruding radially from a wall of the first casing, the bushing segments axially constrained by the two rims within the casing groove, a distance between the two rims corresponding to an axial depth of the bushing segments, the bushing segments slidingly engaged to the first casing within the casing groove.

16. The gas turbine engine of claim 15, wherein one of the two rims defines a cut-out, a radial height of the one of the two rims at the cut-out being less than that of a remainder of the one of the two rims, the radial height sized to allow the bushing segments to be inserted between a portion of the unison ring and the first casing within the casing groove.

17. The gas turbine engine of claim 16, wherein a width of the cut-out taken in a circumferential direction relative to the central axis being at least a width of one of the bushing segments.

18. The gas turbine engine of claim 11, wherein the first casing defines at least one flange, the bushing segments being secured to the at least one flange, the unison ring rotating relative to the bushing segments about the central axis.

19. The gas turbine engine of claim 11, wherein the bushing segments are made of a composite material.

20. The gas turbine engine of claim 11, wherein the first casing is located radially outward of the second casing relative to the central axis.

* * * * *